Feb. 7, 1933.   H. E. NIETSCHE   1,896,462
POWER TRANSMISSION APPARATUS
Filed Aug. 31, 1931   2 Sheets-Sheet 1
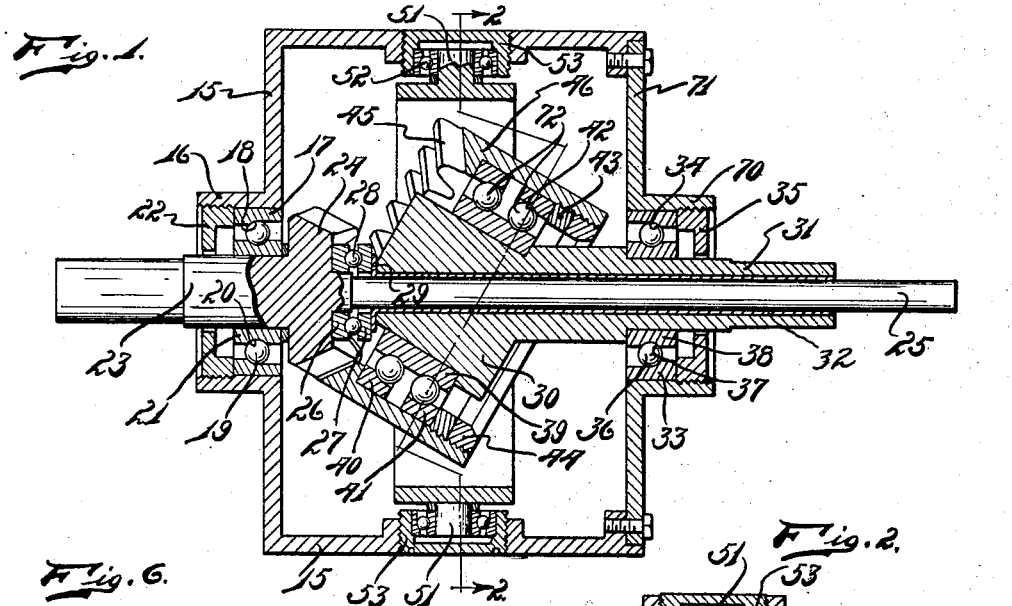
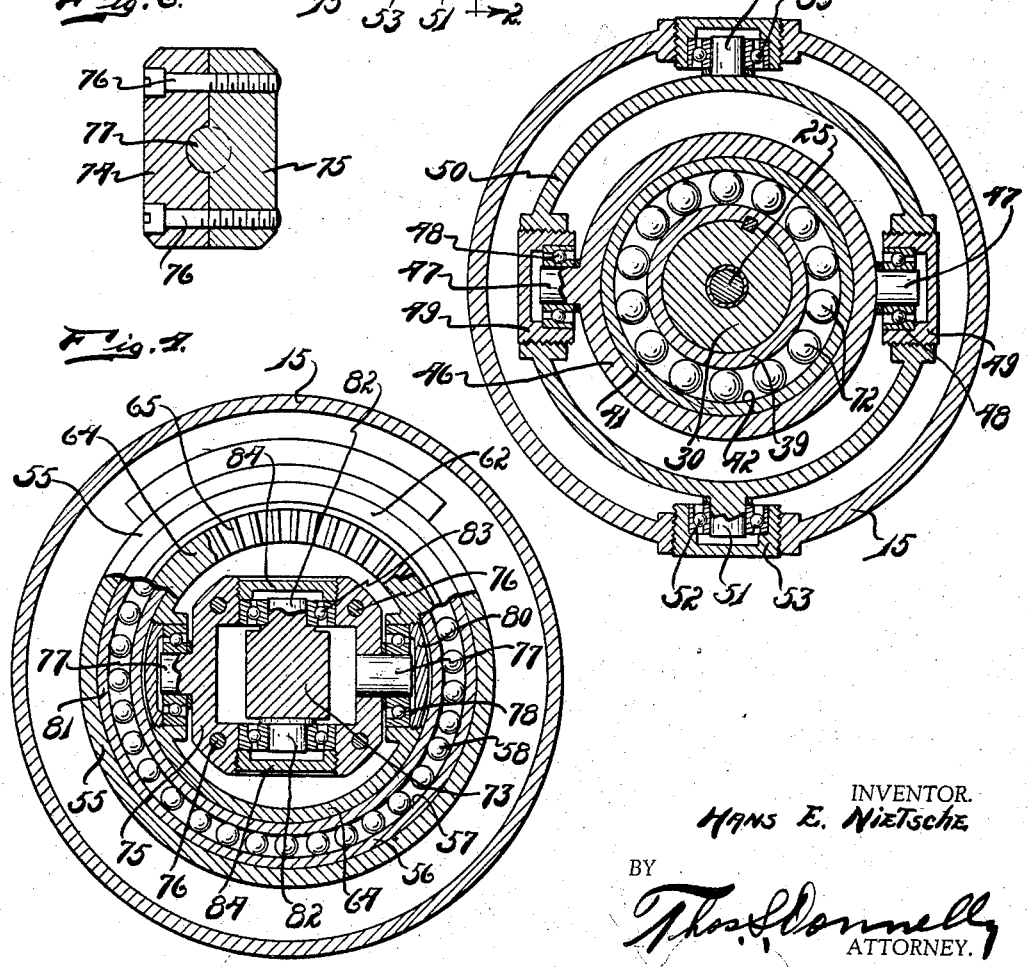
INVENTOR.
Hans E. Nietsche
BY
Thos. L. Donnelly
ATTORNEY.

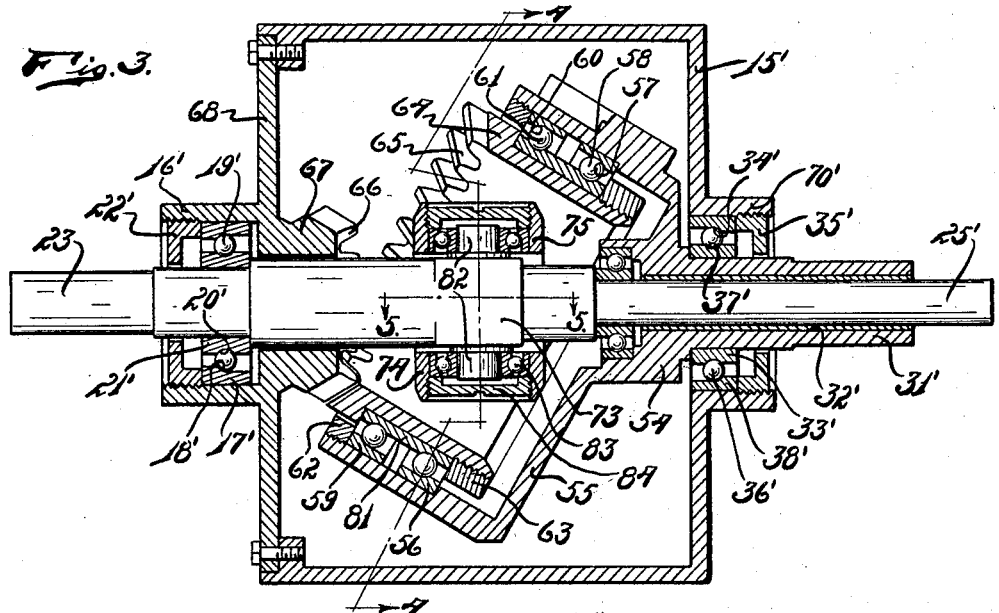

Patented Feb. 7, 1933

1,896,462

UNITED STATES PATENT OFFICE

HANS E. NIETSCHE, OF DETROIT, MICHIGAN

POWER TRANSMISSION APPARATUS

Application filed August 31, 1931. Serial No. 560,268.

My invention relates to a new and useful improvement in a power transmission apparatus, and has for its object the provision of a mechanism whereby the power from a rotating part may be transmitted through an auxiliary member to effect another rotating part.

It is another object of the present invention to provide a mechanism of this class in which the driven shaft is projected through the driving shaft so that the mechanism may be coupled together in a series of units and the power from various driving shafts transmitted to a common driven shaft.

Another object of the invention is the provision in a mechanism of this class of a driving and a driven shaft inter-related so that the driving shaft may oscillate a member for driving the driven shaft and so constructed and arranged that a firm and substantial bearing for both of said shafts may be present.

Another object of the invention is the provision of adjusting means whereby the driven shafts and its actuating mechanism may be adjusted to maintain the parts in proper relation to a neutral operating center.

Another object of the invention is the provision of a device of this class which will be simple in structure, economical of manufacture, durable and efficient in use, compact, and easily and quickly assembled.

Other objects will appear hereinafter.

The invention consists in the combination and arrangement of parts hereinafter described and claimed.

The invention will be best understood by a reference to the accompanying drawings, which form a part of this specification, and in which, Fig. 1 is a central, vertical, longitudinal, sectional view of the invention.

Fig. 2 is a sectional view taken on line 2—2 of Fig. 1.

Fig. 3 is a central, vertical, longitudinal sectional view of a slightly modified form of invention.

Fig. 4 is a sectional view taken on line 4—4 of Fig. 3.

Fig. 5 is a sectional view taken on line 5—5 of Fig. 3.

Fig. 6 is a sectional view taken on line 6—6 of Fig. 5.

Fig. 7 is a central, longitudinal, vertical, sectional view of a further modified form of the invention.

Fig. 8 is a view taken on line 8—8 of Fig. 7.

In the form shown in Fig. 1, I have provided a housing 15 having the cylindrical neck 16 projecting centrally outwardly from its base and in which is positioned a bearing comprising an outer ring 17 having a seat 18 on its inner surface for engagement with the balls 19. These balls 19 also engage the shoulder 20 formed on the ring 21. A retaining ring 22 is threaded into the neck 16, this retaining ring engaging the outer ring 17 and serving as a means for adjusting the bearing in order to take up the wear thereof and also for moving the same inwardly of the housing. Journaled in the bearing is a driven shaft 23 having a gear 24 formed integral therewith and projecting from the inner face of which is a reduced extension 25 of the shaft 23. The inner face of the gear 24 engages the plate 26 of a thrust bearing which cooperates with the plate 27 to retain the balls 28 in position. A washer 29 is positioned between the plate 27 and the face of the actuating head 30 which is formed preferably integral with the driving shaft 31.

The shaft 25 projects through the bushing 32 positioned in the driving shaft 31. The driving shaft 31 is journaled in a bearing comprising the outer ring 33, the balls 36 and the inner ring 38. The outer ring is provided with a seat 34 and the inner ring is provided with a seat 37 against which the balls 36 engage. This bearing is constructed the same as the bearing for the shaft 23 and a retaining ring 35 is threaded into the neck 70 which projects outwardly from the housing cap 71. This ring 35 engages the ring 33 and may be used for adjusting purposes already described.

Embracing the actuating head 30 is a bearing consisting of the ring 39 and the ball retaining rings 40 and 41 provided with seats 42 against which the balls 72 may engage.

A ring 43 is threaded into one end of the annular oscillating member 46 and is adapted to engage the ring 41 so that an adjustment of the bearing may thus be effected. Threaded into the oscillating member 46 is also a ring 44 which serves as a locking ring and serves as a counterbalance for the oscillatory member 46. One end of the oscillatory member 46 is provided with teeth 45 meshing with the teeth on the gear 24. The oscillatory member 46 is provided with oppositely disposed trunnions 47 which are journaled in bearings 48. These bearings 48 are supported in retaining members 49 which are threaded into the supporting band 50. This supporting band is provided with trunnions 51 which are journaled in bearings 52 held by retainers 53 mounted in the housing 15, these retainers 49 being threaded may be moved inwardly and outwardly to adjust the location of the band 50 relatively to the axial center of the housing 15 and the retainers 49 may be moved inwardly and outwardly at right angles to the direction of movement of the retainers 53. Thus there is provided a means for adjusting the various parts so that they may be located or centered relatively to the neutral operating center which is a point determined by the axis of the shaft 25, the axis of the trunnions 51 and the axis of the trunnions 47. By properly maintaining these parts in proper relative position to the neutral operating center point, a vibration and chattering and undue strain on the apparatus is avoided.

In operation, power will be transmitted to the shaft 31 which will rotate the actuating head 30. This rotation of the actuating head 30 will effect an oscillation of the annular oscillatory member 46 which will effect a rotation of the shaft 23 through the medium of the teeth 45 meshing with the gear 24. The shaft 23 will rotate in a direction opposite to the rotation of the driving shaft 31. By providing the driven shaft 23 with the extension 25, the device may be coupled together in a series of units.

In the form shown in Fig. 3, the driven shaft 23 is provided with a reduced extension 25′ which extends through a bushing 32′ mounted in the driving shaft 31′. The shaft 23 is journaled in the bearing consisting of the balls 19′ and retaining rings 17′ and 21′ having the ball engaging shoulders 18′ and 20′, this bearing being mounted in the neck 16′ and retained therein by the adjusting retaining ring 22′. This neck 16′ projects from the end cap 68 on which is fixedly formed a head 67 having teeth 66. These teeth 66 mesh with the teeth 65 formed on the oscillating member 64, which is provided with the lock counterbalancing ring 63 engaging the bearing comprising the ring 81 and the ball retaining rings 56 and 59 having the shoulders 57 and 60 respectively against which engage the balls 58 and 61. An adjusting ring 62 engages the ring 59 and serves as a means for compensating for wear and for localizing the various parts relatively to the neutral center. This ring 62 is threaded into the cup shaped actuating member 55 which is formed integral with the head 54 on the drive shaft 31′. This drive shaft 31′ serves as a bearing for the driven shaft extension 25′ and is itself journaled in a bearing comprising the rings 33′ and 38′ having the shoulders 34′ and 37′ respectively, against which engage the balls 36′. A retaining ring 35′ is threaded into the neck 70′ and serves to engage the ring 38′ and afford an adjusting means for compensating for wear and also for retaining the various parts in proper relative position to the neutral operating center point. Formed on the shaft 23 within the housing 15′ is a flat faced portion 73 which is positioned within a supporting structure comprising the sections 74 and 75, which are secured together by the bolts 76. Projecting outwardly from this supporting structure are oppositely disposed trunnions 77 engaging in bearings 78 mounted in the inwardly projecting neck 79 on the oscillatory member 64 and retained in position by the adjusting retainer 80. Oppositely disposed trunnions 82 projecting outwardly from the flat faced portions 73 of the shaft 23 engage in bearings 83 mounted on the supporting structure consisting of the sections 74 and 75. These bearings 83 are retained in position by the adjusting retainer 84.

In operation, when the power is delivered to the driving shaft 31′, the cup shaped actuating member 55 is rotated and its rotation will effect an oscillation of the oscillating member 64. This will bring about due to the meshing of the teeth 65 with the teeth 66, a rotation of the shaft 23, the shaft 23 in this form rotating in the same direction as the driving shaft 31′. All of the advantages enumerated for the form shown in Fig. 1 are present in the form shown in Fig. 3. The difference of rotation, however, is due to the position of the actuating member outwardly of or in embracing relation to the oscillating member 64.

In the form shown in Fig. 7, the housing 15″ is provided with a neck 16′ in which is located a bearing comprising the rings 17′ and 21′ having the shoulders or seats 18′ and 20′ respectively for engagement with the balls 19′. The retaining ring 22′ is threaded into the neck 16′, this structure being as described for the form shown in Fig. 1. The shaft 23′ is journaled in this bearing and provided with the gear 24′. The reduced extension 25′ extends outwardly from one face of the gear 24′ and engages in the bushing 32′ which extends through the driving shaft 31′. A thrust bearing embodying the plates 26' and 27' and the balls 28' are positioned between the gear 24' and the washer 29' which engages the actuating head 30', this actuating head being formed preferably integral with the driving shaft 31'. This driving shaft is journaled in a bearing embodying the ball retainers 33' and 38' having the seats or shoulders 34' and 37' against which the balls 36' engage. A retaining ring 35' is threaded into the neck 70' which projects outwardly from the housing cap 68'. Formed on this housing cap 68' is a head 67' having teeth 66' formed thereon. An oscillating member 85 embraces the actuating member 30' and is provided at opposite sides with teeth 86 and 87 meshing respectively with the gear 24' and the teeth 66'. A bearing comprising the ball retainers 90 and 88 between which are positioned the balls 89 serves as a connection between the actuating member 30' and the oscillator 85. A ring 91' is threaded onto the actuating head 30' and engages against and serves to lock the ring 90 while a ring 92 is threaded onto the inner surface of the oscillator 85 and engages the ring 88 for the same purpose.

In operation, when power is transmitted to the driving shaft 31', the oscillator 85 is caused to oscillate. This effects a rotation of the driven shaft 23 in a direction opposite to the direction of rotation of the driving shaft 31'. It will be noted that the adjustable feature of the invention whereby the various parts are adjustable so as to maintain the desired location of these parts relatively to the neutral operating center may be effected is a desirable one. It will also be noted that the driven shaft is journaled in the driving shaft and also serves as a bearing for the driving shaft as is the case in all of the forms illustrated.

It will be noted that in all of the forms illustrated, power is transmitted through a rotatable member upon rotation of the driving shaft. This is a desirable feature and one which is productive of marked efficiency in the operation of such a transmission.

While I have illustrated and described the preferred forms of construction of my invention, I do not wish to limit myself to the precise details of structure shown, but desire to avail myself of such variations and modifications as may come within the scope of the appended claims.

Having thus described my invention, what I claim as new and desire to secure by Letters Patent is:

1. In a device of the class described, a driving shaft; an actuating head mounted on and rotatable by said driving shaft; a driven shaft extended through said driving shaft; an oscillating member associated with said driven shaft and oscillated upon rotation of said actuating head and effecting rotation of said driven shaft upon oscillation; and means for adjusting the relative position of said head and said oscillating member relatively to the neutral operating center point.

2. In a device of the class described, a housing; a driving shaft projecting into said housing; an actuating head on the inner end of said driving shaft; a driven shaft projected through said housing, said head, and said driving shaft; an oscillating member associated with said driven shaft and oscillated upon rotation of said driving shaft for effecting a rotation of said driven shaft; a mounting for said oscillating member; and adjustable means in said mounting for adjusting said oscillating member and said head relatively to the neutral operating center.

3. In a device of the class described, a housing; a driving shaft projecting into said housing; a bearing on said housing, said driving shaft being journaled in said bearing; an actuating head on the inner end of said driving shaft; a driven shaft projecting into said housing; a second bearing mounted on said housing, said driven shaft being journaled in said bearing and projecting through said head and said driving shaft, said driven and driving shafts serving as supports for each other; an oscillating member associated with said driven shaft and oscillated, upon rotation of said driving shaft, by said head for effecting a rotation of said driven shaft; and means for adjusting said bearings.

4. In a device of the class described, a housing; a driving shaft projecting into said housing; a bearing on said housing, said driving shaft being journaled in said bearing; an actuating head on the inner end of said driving shaft; a driven shaft projecting into said housing; a second bearing mounted on said housing, said driven shaft being journaled in said bearing and projecting through said head and said driving shaft, said driven and driving shafts serving as supports for each other; an oscillating member associated with said driven shaft and oscillated, upon rotation of said driving shaft, by said head for effecting a rotation of said driven shaft; means for adjusting said bearings; a mounting for said oscillating member; and adjusting means in said mounting for adjusting the location of said oscillating member and said head relatively to the neutral operating center.

5. In a device of the class described, a housing; a driving shaft projecting into said housing; a driven shaft projected through said housing and through said driving shaft; an oscillating member associated with said driven shaft and adapted upon oscillation for rotating said driven shaft; an actuating head carried by said driving shaft for oscillating said oscillating member; and means for mounting said oscillating member on said housing.

6. In a device of the class described, a housing; a driving shaft projecting into said housing; a driven shaft projected through said housing and through said driving shaft; an oscillating member associated with said driven shaft; an actuating head carried by said driving shaft for oscillating said oscillating member; means for mounting said oscillating member on said housing; and means for adjusting the mounting of said oscillating member on said housing.

7. In a device of the class described: a driving shaft; an actuating head mounted on and rotatable by said driving shaft; a driven shaft extended through said driving shaft; an oscillating member associated with said driven shaft and oscillated upon rotation of said actuating head and effecting rotation of said driven shaft upon oscillation; and means for mounting said oscillating member and said driven shaft centered relatively to the neutral operating center.

8. In a device of the class described: a driving shaft; an actuating head rotatable by said driving shaft; a driven shaft extended through said driving shaft; an oscillating member, oscillated upon rotation of said actuating head; means cooperating with said oscillating member for rotating said driven shaft upon actuation of said oscillating member by said head; and means for mounting said head, said oscillating member and said driven shaft centered relatively to the neutral center of operation.

9. In a device of the class described: a driving shaft; an actuating head on said driving shaft and rotatable in unison therewith; an oscillating member adapted for oscillation upon rotation of said driving shaft; a driven shaft extended through and rotatable relatively to said driving shaft; means for operatively connecting said oscillating member and said driven shaft; and means for mounting said oscillating member and said driven shaft centered as to the neutral center of operation.

10. In a device of the class described: a driving shaft; an actuating head mounted on and rotatable by said driving shaft; an oscillating member actuated by said head and adapted for oscillation upon rotation of said shaft; a driven shaft projected through and rotatable relatively to said driving shaft; gear teeth on said oscillating member; gear teeth carried by said driven shaft meshing with the teeth on said oscillating member for effecting a rotation of said driven shaft upon rotation of said driving shaft; and means for mounting said oscillating member and said driven shaft centered as to the neutral center of operation.

11. In a device of the class described: a driving shaft; an actuating head mounted on and rotatable by said driving shaft; a driven shaft extended through said driving shaft and rotatable relatively thereto; an oscillating member adapted for oscillation upon rotation of said actuating head; gear teeth carried by said oscillating member; a gear mounted on said driven shaft and meshing with the teeth on said oscillating member for effecting rotation of said driven shaft upon rotation of said driving shaft; and means for adjusting the relative position of said head and said oscillating member relatively to the neutral operating center point.

12. In a device of the class described: a driving shaft; an actuating head mounted on and rotatable by said driving shaft; a driven shaft extended through said driving shaft; an oscillating member adapted for oscillation upon rotation of said actuating head; gear teeth carried by said oscillating member; a gear mounted on said driven shaft and meshing with the teeth on said oscillating member for effecting rotation of said driven shaft upon oscillation of said oscillating member; and means for mounting said oscillating member and said head centered relatively to the neutral operating center point.

13. In a device of the class described: a driving shaft; an actuating member mounted on and rotatable by said driving shaft; a driven shaft extended through said driving shaft and rotatable relatively thereto; an oscillating member associated with said actuating member and adapted for oscillation upon rotation of said actuating member; axially directed gear teeth carried by said oscillating member and axially spaced from the neutral operating center of said member; and a gear meshing with the teeth on said member and adapted for effecting, upon oscillation of said oscillating member, a rotation of said driven shaft, the point of engagement of the teeth relatively to the neutral operating center of said oscillating member being spaced axially therefrom a distance for preventing interlocking.

14. In a device of the class described: a driving shaft; an actuating member mounted on and rotatable by said driving shaft; a driven shaft extended through said driving shaft and rotatable relatively thereto; an oscillating member associated with said actuating member and adapted for oscillation upon rotation of said actuating member; gear teeth carried by said oscillating member; a gear meshing with the teeth on said oscillating member and associated with said driven shaft for effecting a rotation of said driven shaft upon a rotation of said driving shaft, the point of engagement of the teeth and said gear being spaced axially from the neutral operating center of said oscillating member sufficiently for preventing interlocking of the teeth and permitting driving through the driven shaft and the driving shaft at will.

15. In a device of the class described: a driving shaft; an actuating member mounted on and rotatable by said driving shaft; a driven shaft extended through said driving shaft and rotatable relatively thereto; an oscillating member associated with said actuating member and adapted for oscillation upon rotation of said actuating member; gear teeth carried by said oscillating member; a gear meshing with the teeth on said oscillating member and associated with said driven shaft for effecting a rotation of said shaft upon a rotation of said driving shaft, the point of engagement of said gear with said teeth being offset relatively to the neutral operating center of said actuating member, said oscillating member and said shafts for preventing interlocking of the gearing and permitting operation of the same from either shaft as a driving shaft.

In testimony whereof I have signed the foregoing specification.

HANS E. NIETSCHE.